E. A. LE BEAU.
BRAKE BEAM.
APPLICATION FILED JUNE 3, 1909.

1,023,474.

Patented Apr. 16, 1912.

Witnesses
A. J. McCauley
W. C. Smith

Inventor:
Ernest A. Le Beau
by
J. R. Cornwall Atty.

COLUMBIA PLANOGRAPH CO., WASHINGTON, D. C.

UNITED STATES PATENT OFFICE.

ERNEST A. LE BEAU, OF CHICAGO, ILLINOIS, ASSIGNOR TO CHICAGO RAILWAY EQUIPMENT COMPANY, OF CHICAGO, ILLINOIS, A CORPORATION.

BRAKE-BEAM.

1,023,474.  Specification of Letters Patent.  Patented Apr. 16, 1912.

Application filed June 3, 1909. Serial No. 499,915.

*To all whom it may concern:*

Be it known that I, ERNEST A. LE BEAU, a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1:
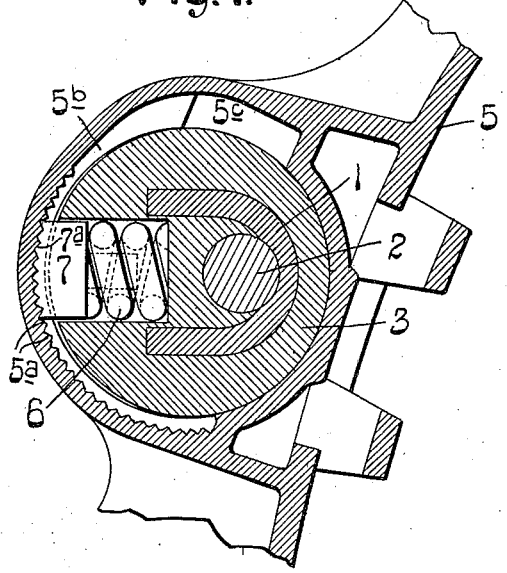
Figure 2:
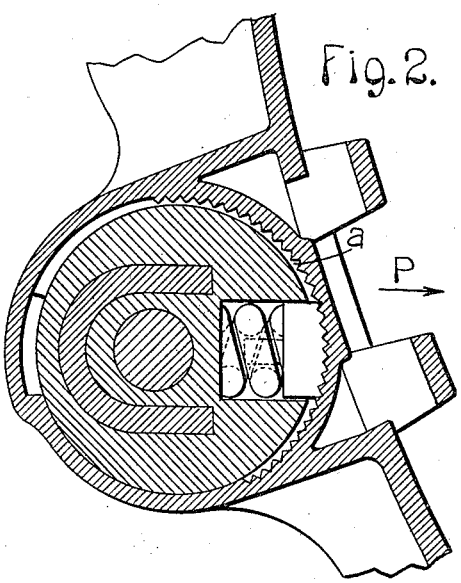
Figure 3:
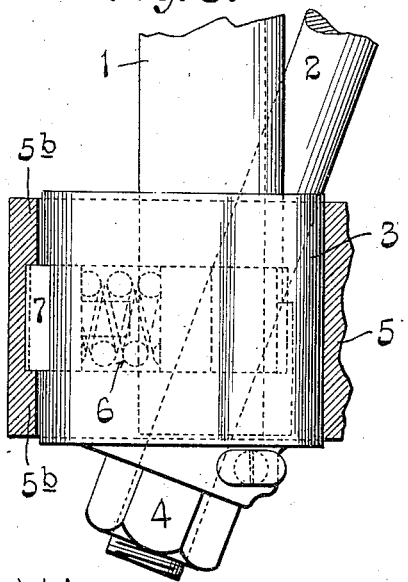
Figure 4:
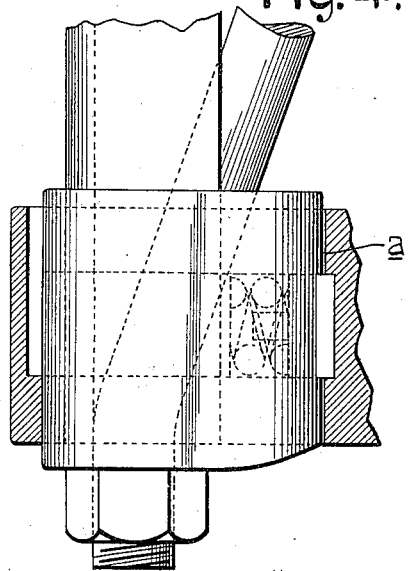

Figure 1 is a vertical sectional view through the end of a brake beam showing my improved method of adjustably mounting the brake head thereon; Fig. 2 is a similar view showing a modified arrangement of locking block; Fig. 3 is a top plan view, partly in section, of the construction shown in Fig. 1; Fig. 4 is a top plan view, partly in section, of the construction shown in Fig. 2.

This invention relates to a new and useful improvement in brake beams, and particularly to the adjustable brake head mounted on the beam, the invention belonging to that class of adjustable brake heads as illustrated in the patent to Henry B. Robischung, No. 485,823, dated November 8, 1892. In the present instance, however, the locking block is mounted in the sleeve or thrust block, being forced outwardly by a spring to bear against the brake head, whereas in said Robischung patent the locking block is carried by the brake head and pressed inwardly against the sleeve or thrust block. According to the Robischung patent aforesaid, the heads were adjustably locked on the brake beam in such manner that when the brake beams were hung in position the heads would automatically adjust themselves to the wheels, irrespective of the character or position of the brake hangings, the locking blocks yielding to permit the heads to assume their proper position and holding said heads in their proper position during subsequent applications of the brake.

The object of my present invention is to adjustably mount the heads on a brake beam so that it will possess all the advantages of the Robischung adjustable head, and in addition, possess the additional advantage of a saving in space incident to the exterior arrangement of the spring housing in the Robischung patent, which exteriorly arranged spring housing prevented the use of the Robischung adjustable heads in some types of trucks, particularly on inside hung brakes.

According to my present invention, the spring-pressed locking block can be arranged at any desired point within the thrust block or sleeve, without increasing the size or weight of the brake head, and this capacity for being mounted in different positions possesses the additional advantage of taking up wear and lost motion between the brake head and the sleeve. In order to understand this advantage it will be remembered that a clearance space is necessary for the introduction of the brake head upon the thrust block or sleeve, which space constitutes lost motion which has to be taken up before any pressure can be applied to the brake shoes. For instance, according to the construction shown in Fig. 2, if braking pressure is applied to the beam through the levers in the direction of the arrow P, the space $a$ in the nature of lost motion must be taken up before any pressure can be applied to the brake shoes. This space $a$, regardless of how small or how large it might be, is multiplied many times through the leverage back to the brake cylinder, and the piston in the brake cylinder is thereby compelled to make a greater stroke in applying the brakes, because of this space $a$. In ordinary brake rigging, the extra movement of the piston necessary to take up this lost motion would be practically sixteen times, more or less, the distance consumed by the lost motion. Furthermore, through the pressure of the spring-pressed locking pawl applied as in Patent No. 485,823, a space between the under side of the thrust block and the brake head is provided, which space permits constant vibration, which tends to deteriorate the spring and wear the rubbing surfaces between the thrust block and the brake head, which wear increases the clearance opening under consideration.

By being able to locate the spring-pressed locking block at any point so that the pressure of the spring will be exerted in any direction within the circle of the thrust block, I am enabled to utilize the spring pressure to take up the clearance spaces referred to on the front and under sides of the thrust block, locating them on the upper and rear sides of said thrust block where they are of no consequence.

In the accompanying drawings, 1 indicates the compression member, 2 the tension member, 3 the thrust block or sleeve arranged on the end of the compression member and through which the tension member passes, the latter having a nut 4 on its end. 5 is the brake head. The brake beam illustrated, being of the trussed type, has a strut, not shown, and may be provided with the usual guard fingers and other usual accessories.

The thrust block or sleeve is provided with a socket, preferably rectangular in contour, in which is located a spring 6 coöperating with a locking block 7, which locking block is rectangular in shape and provided with serrations or teeth 7ª on its outer surface. These serrations or teeth coöperate with serrations or teeth 5ª on the inner surface of the brake head socket, as shown. The brake head is provided with flanges 5ᵇ on each side of these teeth or serrations 5ª between which the locking block 7 is received, whereby the brake head is prevented from longitudinal displacement. One of these flanges 5ᵇ is cut away at 5ᶜ so that the brake head may be introduced upon or removed from position without retracting the locking block. This cut-away portion 5ᶜ is preferably located at one end of the recessed portion containing the serrations or teeth necessitating the turning of the brake head on the sleeve after being introduced thereon to its ultimate position, which turning locks the brake head against longitudinal displacement. The groove formed by these flanges is eccentrically disposed so that the spring 6 is placed under compression as the head is turned, and the necessary amount of outward pressure is thus produced when the block is in proper position. To remove the brake head, it is rotated on the sleeve until the locking block registers with the cut-away portion 5ᶜ, when the head may be slid longitudinally the beam.

When the block is in the position shown in Fig. 1, it will be noticed that the energy of spring 6 is so directed that the clearance space a, before referred to, is completely taken up so that there is no lost motion to consume part of the stroke of the piston in the air cylinder. The locking block could be positioned as shown in Fig. 2, if it was desired to so locate it at this point, or the locking block could be arranged vertically, at an angle of 45 degrees, or in fact any angle desired. In arranging the locking block at different angles, it is possible to not only take up clearance in front of the sleeve to save the extra work of the piston in the air cylinder, but it is also possible to take up the clearance under the sleeve so as to prevent vibration between the parts.

By arranging the locking block and spring within the thrust block, it is possible to use beams with adjustable heads as inside hung brakes in trucks, where type of beam of Robischung's adjustable head is not now available.

I am aware that minor changes in the construction, arrangement and combination of the several parts of my device can be made and substituted for those herein shown and described, without in the least departing from the nature and principle of my invention.

What I claim is:

1. The combination of a brake beam, a brake head provided with a socket within which a portion of the brake beam extends, a spring-pressed locking block carried by the brake beam and so disposed with relation to said head that the forward wall of said socket is yieldingly forced toward the part of the brake beam on which the brake head is mounted.

2. The combination of a brake beam, a brake head provided with a socket within which a portion of the brake beam is mounted, a spring-pressed locking block carried by the brake beam and yieldingly adapted to force the bottom of the socket toward the brake beam.

3. The combination of a brake beam, an adjustable head mounted thereon, said head having means for attachment of a brake hanger, and means on the beam for taking up the clearance space between the head and the beam, said means assisting gravity in preventing the parts from rattling.

4. The combination of a brake beam, a brake head mounted thereon, and means mounted on the beam for taking up clearance space between the head and the beam so that no lost motion will have to be overcome in applying the brakes.

5. The combination of a brake head having inwardly extending flanges, one of which is provided with a notch and a sleeve or member on the brake beam provided with a removable projection designed to pass through said notch in assembling or dismantling the beam.

6. The combination of a brake head having inwardly extending flanges, one of which is notched, and a brake beam carrying a yielding projection designed to pass through said notch in assembling and dismantling the beam.

7. A brake head having inwardly extending flanges, one of which is provided with a notch, said flanges forming a groove, one portion of which is serrated.

8. A brake head having an eccentric groove in its socket, one wall of which groove is cut away.

9. A brake head having a groove in its socket, the bottom of which is serrated.

10. A brake head having a groove in its socket, the bottom of which is serrated and one wall of which, at or near the end of said groove, is cut away.

11. A brake head having an eccentric groove, one wall of which is cut away, in combination with a brake beam part having a movable member adapted to pass through said cutaway portion, and be moved by said eccentric groove.

12. The combination of a brake beam comprising a sleeve having an opening in one of its sides; a locking block slidably mounted in said opening and curved upon its outer side to conform to the periphery of said sleeve, said outer side being toothed; a brake head mounted on said sleeve; and means for moving said block into engagement with said head.

13. In a device of the character described, the combination of a brake-beam, a brake-head adapted to fit on and rotatably adjustable on said brake-beam, a lock-block inside of said head and adapted to bear against an inner surface of said head to maintain the latter in adjusted position, and means to actuate said block to press the same into locking contact with said head, substantially as described.

14. In a device of the character described, the combination of a brake-beam having a recess in its outer surface, a brake-head adapted to fit on and rotatably adjustable on said brake-beam, a lock-block fitted in said recess, disposed inside of said head and adapted to bear against an inner surface of said head to maintain the latter in adjusted position, and means to actuate said block to press the same into locking contact with said head, substantially as described.

15. In a device of the character described, the combination of a brake-beam having a recess in its outer surface, a brake-head adapted to fit on and rotatably adjustable on said brake-beam and having an inner roughened surface, a lock-block in said recess inside of said head and having a roughened surface adapted to bear against the roughened surface of said head to maintain said head in adjusted position, and means to actuate said block to force the same into locking contact with said head, substantially as described.

16. In a device of the character described, the combination of a brake-beam, a recessed sleeve fitted on the end of said brake-beam, a lock-block in said recess, a brake-head adapted to fit on and rotatably adjustable on said sleeve, and means to force said lock-block outwardly into locking engagement with an inner surface of said brake-head to maintain the latter in adjusted position, substantially as described.

17. The combination of a brake head, of a part of the brake beam on which the same is mounted, said part having a movable wall whereby a dimension may be changed for the purpose of holding the brake head in adjusted position.

18. The combination of a brake head, of a cylindrical part of the brake beam on which it is mounted, one wall of said cylindrical portion being outwardly movable and means for moving said wall outwardly.

In testimony whereof I hereunto affix my signature in the presence of two witnesses, this 26th day of May, 1909.

ERNEST A. LE BEAU.

Witnesses:
 E. T. WALKER,
 J. W. WEINLAND.

Copies of this patent may be obtained for five cents each, by addressing the "Commissioner of Patents, Washington, D. C."